INVENTOR
Wilhelm Gärtner

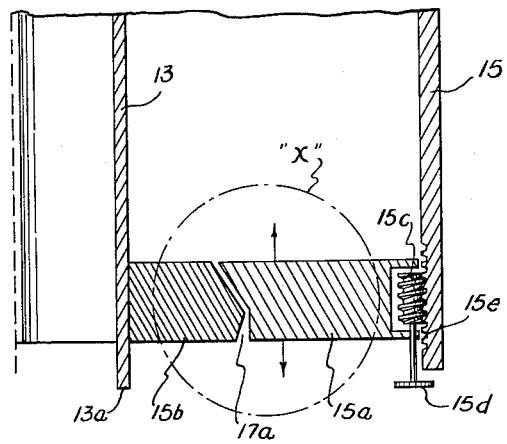
Fig. 3
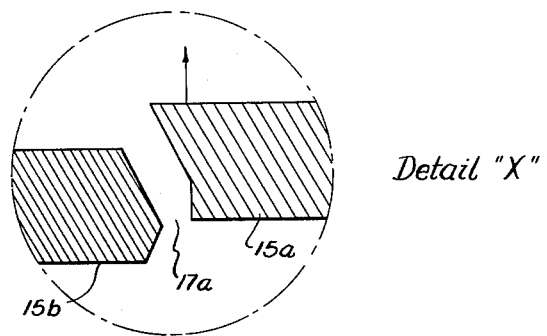
Detail "X"
INVENTOR
Wilhelm Gärtner

United States Patent Office 3,229,850
Patented Jan. 18, 1966

3,229,850
METHOD AND APPARATUS FOR ADDING MATERIALS FREE FROM DUST AND ODORS
Wilhelm Gärtner, Neunkirchen, Odenwald, Germany, assignor to Deutsche Gold- und Silber-Scheideanstalt vormals Roessler, Frankfurt am Main, Germany
Filed Apr. 17, 1964, Ser. No. 360,596
Claims priority, application Germany, Apr. 18, 1963,
D 41,393
8 Claims. (Cl. 222—1)

This invention relates to a method and apparatus for adding a substance to some medium and, in particular, to adding the substance without causing dust in the air or the release of unpleasant odors.

The adding of a measured amount of one substance to another often produces problems because of the release of dust or unpleasant odors into the ambient air. Numerous attempts have been made to eliminate the dust and odors. Generally, the measured amounts of solids or liquids are handled in a completely enclosed apparatus. Such is disadvantageous because of the inaccessibility of the materials and the difficulty in handling them. Furthermore, a completely enclosed apparatus is not entirely effective because, despite all precautions, very fine dust and traces of the odors escape from the apparatus. Moreover, the lack of accessibility and inspection in an enclosed apparatus is disadvantageous when the substances or materials to be measured and mixed are hydroscopic. Such materials soil the apparatus and cause scaling which affects the accuracy of the apparatus, and the scale can only be removed by shutting down the apparatus. Also, the scaling and shut downs soon make ineffective any kind of a dust removal apparatus which might be used.

According to this invention, it has been found that the difficulties of adding measured amounts of the material or substance can be avoided if, between a substance storage hopper and the surface of the medium below it, there is provided a tubular liquid jacket. The measured substance is passed from the hopper onto the surface of the medium through the tubular space surrounded by the liquid jacket.

In this way, the measured amount of substance, regardless of whether it is a solid or a liquid is enclosed along with its dust and its odors within the tubular jacket during the passage of the substance to the hopper to the receiving medium without the necessity of using awkward apparatus at the transfer point. When a transparent liquid is used to form the tubular jacket, then the flow of the measured amount of substance can be observed and controlled at all times. This method of adding the measured amount of material is especially worthy for the adding of solid hydroscopic powdered substances to a liquid medium.

Figure 1:
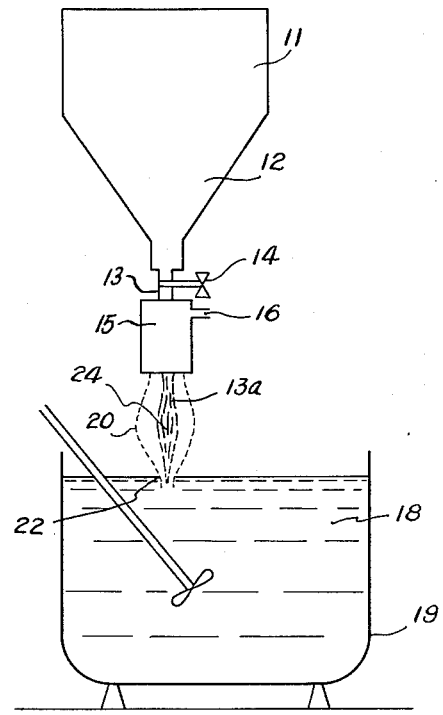
Figure 2:
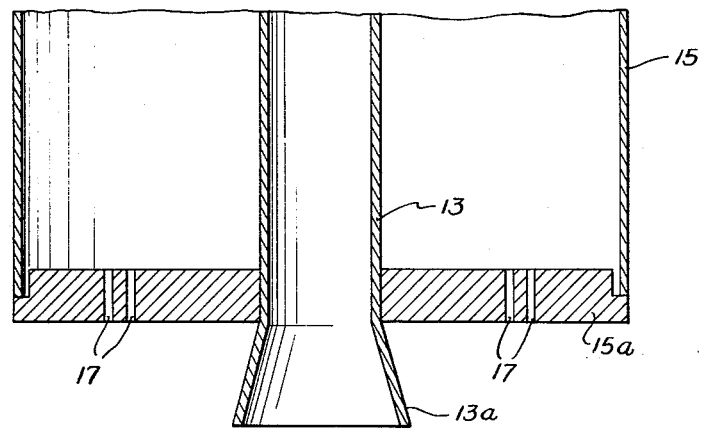

The means by which the objects of the invention are obtained are described more fully with reference to the accompanying drawings in which:

FIGURE 1 is a schematic view of the apparatus; and
FIGURE 2 is an enlarged cross-sectional view of a portion of the water box used for forming the tubular liquid jacket.
FIGURE 3 shows a schematic view another embodiment of the invention and a detail "X" of the embodiment.

As shown in FIGURE 1, the material or substance is placed in the storage container 11 at the lower end of which is a hopper 12. A discharge tube 13 extends from the lower end of the hopper. This tube can be closed by means of a valve 14. As shown in detail in FIGURE 2, tube 13 is surrounded by a circular water box 15 having a bottom 15a. A liquid such as water is introduced into box 15 through supply pipe 16. In the bottom 15a are a plurality of holes 17. These holes are in circular rows concentric with the bottom 15a and each hole acts as a nozzle so that a plurality of individual liquid jets are discharged through the bottom 15a, which jets immediately merge to form a tubular liquid jacket. This jacket extends from the bottom 15a to the upper surface of the receiving medium 18 contained in tank 19. As indicated in FIGURE 1, this tubular jacket 20 contacts the surface of the medium 18 on a circular line so that the measured amount of substance 24 leaves the pipe 13 and enters the medium 18 without being exposed to the atmosphere.

The tubular liquid jacket 20 which surrounds the discharge end 13a of the tube 13 has the approximate shape of a pear. Its shape changes according to the pressure applied to the liquid in the box 15. The shape can be elongated by an increase in pressure, while lower pressures shorten the length of the tubular liquid jacket to a more spherical shape. By changing the pressure, the length of the liquid jacket can be adjusted from the bottom 15a to the surface of the receiving medium 18. The lower edge of the jacket 20 should at least enter the surface of the medium 18 and form at this point a dust and odor proof closure over a sufficiently large cross-section.

The holes 17 in the bottom 15a are fine circular bores for the ejection of the liquid from the box 15. Tube 13 is concentric with bottom 15a and extends through box 15. Holes 17 are arranged in a plurality of circular rows. The merging of the individual jets into one closed liquid tubular jacket can be enhanced by inclining the holes 17 from the vertical so that a swirl of liquid is created in the jacket. Holes 17 preferably have a length of at least 1.5 mm. Special nozzles can also be inserted into the holes.

In a modified form, the structure is simplified by using an annular opening in place of the holes 17. This annular opening is adjustable in order to be adapted to the use of different kinds of liquid to form the liquid jacket.

FIGURE 3 shows the tube 13 with nozzle 13a. The hollow cylinder 15 is shaped at its lower end in form of two annular disks 15a and 15b, whereby the annular disk 15b surrounding the tube 13 is fastened to the latter. The annular disk 15a is mounted movably to the wall of the cylinder 15. By means of a worm wheel 15c, a rack 15e provided at the wall of cylinder 15 and a regulating screw 15d, the annular disk 15a may be moved up and down.

It is also possible to have the annular disk 15b movably arranged to the tube 13, so that both annular disks 15a and 15b or each of them may be moved up and down. The annular disks 15a and 15b in the area of the annular slit-like opening 17a are formed conically, so that on moving the disks up and down the slit-like opening 17a is opened, enlarged, reduced or closed. The detail "X" shows the situation of the enlarged slit-like opening 17a.

As heretofore stated, a change in the pressure on the liquid in box 15 can change the shape and length of the liquid jacket. However, it is preferred that the pressure on the ejected liquid should be at least 0.2 atmosphere.

The method of this invention can be used for the distributing of measured amounts of a solid as well as a liquid substance. The only limitation is that the solid substance should be pourable and passable under free fall through the liquid jacket. The adding of measured amounts of substances according to this invention is completely free of the release of dust and odors and is especially useful for very dusty substances as well as hydroscopic and corrosive substances. The proper distribution of the substances can be visually observed and controlled at a close range without any irritating interference. The dischange end 13a of tube 13 should be conically flared for such solid substances. The feeding of the substances from the hopper 12 into tube 13 can be metered by any conventional means, such as by metering valves. This permits the installation of the apparatus of this invention in existing metering apparatuses.

Having now described the means by which the objects of the invention are obtained,

I claim:

1. A method for the dust free and odorless adding of measured amounts of a substance to a medium comprising pouring said substance from a container into said medium, and simultaneously forming a liquid tubular jacket spaced from and completely surrounding said substance without mixing therewith between the bottom of said container and the surface of said medium.

2. A method as in claim 1, further comprising applying a pressure of at least 0.2 atmosphere to said substance for passing it through said jacket.

3. An apparatus for adding measured amounts of a substance to a medium in an odorless and dust free manner comprising a container for said substance, a downwardly directed substance discharge tube joined to said container, a cylinder for holding a liquid having a bottom surrounding said tube, and liquid discharge opening means in said bottom directed for forming a tubular liquid jacket around the outlet end of said tube and spaced from and completely surrounding the substance discharged from said tube without mixing therewith.

4. An apparatus for adding measured amounts of a substance to a medium in an odorless and dust free manner comprising a container for said substance, a downwardly directed substance discharge tube joined to said container, a cylinder for holding a liquid and having a bottom surrounding said tube, and a plurality of small liquid discharge circular holes in said bottom directed for forming a tubular liquid jacket around the outlet end of said tube and spaced from and completely surrounding the substance discharged from said tube without mixing therewith.

5. An apparatus as in claim 4, said holes being arranged in a plurality of circular rows concentric to said bottom.

6. An apparatus as in claim 5, said holes being inclined from the vertical.

7. An apparatus as in claim 6, said holes having a length of at least 1.5 mm.

8. An apparatus as in claim 3, said opening means comprising an adjustable annular opening.

References Cited by the Examiner
UNITED STATES PATENTS

| | | | |
|---|---|---|---|
| 934,259 | 9/1909 | Allen | 222—559 X |
| 1,271,420 | 7/1918 | Bewan | 222—145 X |
| 2,236,551 | 4/1941 | Striegel | 239—424 |
| 2,436,335 | 2/1948 | Simonsen | 239—420 X |
| 2,522,936 | 9/1950 | Ferguson | 239—424 X |
| 2,766,073 | 10/1956 | Bergstrom | 239—424 X |
| 3,093,314 | 6/1963 | Meyer | 239—425 X |
| 3,117,726 | 1/1964 | Schöberg | 239—291 |
| 3,135,630 | 6/1964 | Bielinski et al. | 222—190 X |

FOREIGN PATENTS 714,294  11/1941  Germany.

RAPHAEL M. LUPO, *Primary Examiner.*